(12) United States Patent
Blackmon et al.

(10) Patent No.: US 8,352,786 B2
(45) Date of Patent: Jan. 8, 2013

(54) COMPRESSED REPLAY BUFFER

(75) Inventors: Herman L. Blackmon, Moline, IL (US);
Ryan S. Haraden, Rochester, MN (US);
Joseph A. Kirscht, Rochester, MN (US);
Elizabeth A. McGlone, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 12/839,870

(22) Filed: Jul. 20, 2010

(65) Prior Publication Data

US 2012/0023368 A1    Jan. 26, 2012

(51) Int. Cl.
*G06F 11/00* (2006.01)

(52) U.S. Cl. .............................. 714/18; 714/16; 714/55

(58) Field of Classification Search .................. 714/16, 714/18, 55
See application file for complete search history.

(56) References Cited

U.S. PATENT DOCUMENTS

| | | | | |
|---|---|---|---|---|
| 6,629,264 B1 * | 9/2003 | Sicola et al. | ................... | 714/15 |
| 6,732,124 B1 * | 5/2004 | Koseki et al. | .......................... | 1/1 |
| 7,277,449 B2 * | 10/2007 | Garinger et al. | ............... | 370/419 |
| 7,586,805 B2 * | 9/2009 | Remaklus et al. | ............. | 365/222 |
| 7,681,076 B1 * | 3/2010 | Sarma | ............................. | 714/16 |
| 7,792,014 B2 * | 9/2010 | Tsang | ........................... | 370/216 |
| 7,930,684 B2 * | 4/2011 | Roeck et al. | ................... | 717/129 |
| 8,051,328 B1 * | 11/2011 | Smith et al. | ...................... | 714/15 |
| 8,132,048 B2 * | 3/2012 | Blackmon et al. | ............... | 714/18 |
| 2003/0131216 A1 * | 7/2003 | Henkel et al. | ................... | 712/200 |
| 2009/0006710 A1 * | 1/2009 | Daniel et al. | ................... | 710/315 |
| 2009/0086735 A1 * | 4/2009 | Tsang | ........................... | 370/394 |
| 2010/0211822 A1 * | 8/2010 | Colaiacomo et al. | ........... | 714/16 |
| 2010/0299499 A1 * | 11/2010 | Golla et al. | .................... | 712/206 |
| 2012/0079322 A1 * | 3/2012 | Gupta et al. | .................... | 714/16 |

* cited by examiner

*Primary Examiner* — Joshua P Lottich
(74) *Attorney, Agent, or Firm* — Robert R. Williams

(57) ABSTRACT

A compressed replay buffer in a first electronic unit of an electronic system holds commands in a table. As commands are transmitted from the first electronic unit to a second electronic unit, the command, along with associated data, command type, and the like are stored in a row in the table. No rows in the table contain "dead cycles" to indicate that no command was sent on a particular cycle on a bus over which the commands were transmitted. The second electronic unit may request that the first electronic unit replay some number of commands. In response, the first electronic unit uses commands in the compressed replay buffer, along with required timings stored on the first electronic unit, to replay the number of commands requested.

12 Claims, 5 Drawing Sheets

| | RAS or CAS | Pointer to Write Data |
|---|---|---|
| 0 | $R_1$ | |
| 1 | | |
| 2 | | |
| 3 | $R_2$ | |
| 4 | | |
| 5 | | |
| 6 | | |
| 7 | | |
| 8 | | |
| 9 | | |
| 10 | | |
| 11 | | |
| 12 | $C_1$ | |
| 13 | | |
| 14 | | |
| 15 | $C_2$ | |
| | | |
| | | |
| | | |
| | | |

Fig. 3
(Prior Art)

|   | Row Addr | Col Addr | Pointer to Write Data |
|---|---|---|---|
| 0 | $R_1$ | $C_1$ | |
| 1 | $R_2$ | $C_2$ | |
| | | | |
| | | | |
| | | | |
| | | | |
| | | | |
| N-1 | | | |

| $R_1$ | | | | | | | | | | | $C_1$ | | | $R_2$ | | | | | | | | | | | | $C_2$ |

Fig. 5

|   | Row Addr | Col Addr | Pointer to Write Data |
|---|---|---|---|
| 0 | $R_1$ | $C_1$ | |
| 1 | | $C_2$ | |
| | | $C_3$ | |
| | | | |
| | | | |
| | | | |
| | | | |
| N-1 | | | |

| $R_1$ | | | | | | | | | | | $C_1$ | | $C_2$ | | $C_3$ |

Fig. 7

| Cmd Type | Cmd Data | Associated Data |
|---|---|---|
| 000 | RAS Addr | |
| 001 | CAS Addr | |
| 000 | RAS Addr | |
| 001 | CAS Addr | |
| | | |
| | | |

Fig. 9

COMPRESSED REPLAY BUFFER

FIELD OF THE INVENTION

This invention relates generally to electronic systems, and in particular to electronic systems that communicate electronically using a series of commands and data. In the event of an error in communication, a number of commands and data transmissions are replayed.

SUMMARY OF EMBODIMENTS OF THE INVENTION

Generally, an electronic system comprises a first electronic unit that must communicate with a second electronic unit over a bus. For example, when the electronic system is a computer, a memory controller sends commands to a memory. Exemplary commands transmitted from a memory controller to a memory include RAS (Row Address, including command and address), CAS (Column Address, including command and address). Other commands may be transmitted as well.

Data busses are designed to be reliable; however, to maximize performance, most data busses do tolerate some level of errors, such as one bit error out of a trillion bits transmitted. Typically, the second electronic unit, the receiver, checks for errors, using parity, cyclical redundancy checking, error correcting codes, and the like. Upon detection of an error, the second electronic unit may request retransmission of some number of commands (with associated data, addresses, and the like) from the first electronic unit. In response, the first electronic unit replays some number of commands, retransmitting the commands (and associated address and perhaps other data) to the second electronic unit. For example, the number of commands may be requested by the second electronic unit, a fixed number specified by a designer, a fixed number that is programmed into a particular system or otherwise specified.

In an embodiment, the first electronic unit comprises a compressed replay buffer and storage for required timings. When the first electronic unit sends commands, the commands are stored in the compressed replay buffer. During transmission of commands, no rows in the compressed replay buffer are left blank to account for "dead cycles" on the bus. Instead, during replay, the first electronic unit transmits each command (that is to be replayed) from the compressed replay buffer, and uses command types from the compressed replay buffer and values in the required timings associated with command-to-command required spacings to replay the commands to the second electronic unit.

BRIEF DESCRIPTION OF THE DRAWINGS

FIG. 3 shows a prior art uncompressed replay buffer.

FIG. 4 shows a compressed replay buffer.

FIG. 5 shows replay of commands originally issued a shown in FIG. 2 using the compressed replay buffer of FIG. 4.

FIG. 6 shows a compressed replay buffer where a RAS is followed by multiple CAS.

FIG. 7 shows a timing chart using the replay buffer of FIG. 6.

FIG. 9 shows a further embodiment of a compressed replay buffer.

DETAILED DESCRIPTION OF THE EMBODIMENTS

In the following detailed description of embodiments of the invention, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Embodiments of the present invention provide for replaying a series of commands using a compressed replay buffer and stored required timings.

Figure 1:
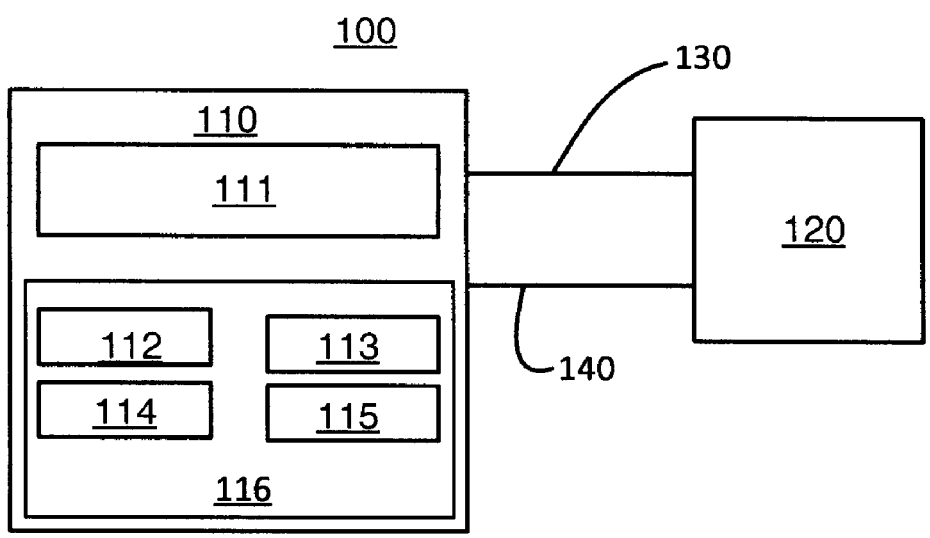
FIG. 1 shows an exemplary computer system containing embodiments of the invention.

FIG. 1 shows an exemplary electronic system 100 comprising a first electronic unit 110 and a second electronic unit 120 coupled by a bus 130 and a status 140. First electronic unit further comprises required timings 116 which hold one or more values for required timings for transmitting commands when those commands are replayed on bus 130. First electronic unit 110 transmits commands, and, perhaps, associated data and/or pointers to second electronic unit 120 over bus 130. Modern implementations of bus 130 are designed to reliably transmit data. For example, bus 130 may have a bit error rate (BER) of approximately 10E-12. In other words, one may expect one transmitted bit to be received in error only once out of one trillion bits transmitted. When an error is detected by second electronic unit 120 (e.g., a parity error), the error may be reported from second electronic unit 120 back to first electronic unit 110 on status 140. First electronic unit 110 may then replay already-sent commands on bus 130 using a compressed replay buffer 111 and required timing values from required timings 116 such as, for a memory control system used as an exemplary embodiment, RTC (RAS To CAS) 112, RTR (RAS To RAS) 113, CTR (CAS To RAS) 114, and CTC (CAS to CAS) 115.

"RAS" is a "row address command" in a memory system, in which a command, a row address, and a strobe may be transmitted from a memory controller to a memory, with timings suitable for a particular memory controller and memory. "RAS" is often used to mean the row address command and the row address as a group.

"CAS" is a "column address command" in a memory system, in which a command, a column address, and a strobe may be transmitted from a memory controller to a memory, with timings suitable for a particular memory controller and memory. "CAS" is often used to mean the column address command and the column address as a group.

Conventional uncompressed replay buffers are relatively large, storing a command and, possibly, data and/or pointers associated with the command with a row in the conventional uncompressed replay buffer for each cycle on a bus over which the commands are sent. The conventional uncompressed replay buffer requires a number of rows corresponding to a number of cycles on the bus that must be replayed. When replay is required, the conventional uncompressed replay buffer is simply replayed, sending whatever is in a particular row of the replay buffer on each cycle of the bus. Many or most rows in the conventional uncompressed replay buffer are "dead cycle" rows which contain no commands and merely correspond to bus cycles during which no commands are transmitted. Exemplary items stored in a conventional uncompressed replay buffer are shown in FIG. 3 for an exemplary command sequence shown in FIG. 2. A separate column is shown that may contain a pointer to write data in the event of a write to memory. The column "RAS or CAS" contains row addresses and column addresses. Some means of identifying which is a row address and which is a column address is needed and may be implemented, for example by including a leading bit in that column where a "1" in the leading bit indicates a row address (i.e., part of a RAS) and a "0" in the leading bit indicates a column address (i.e., part of a CAS). If additional command types beyond row address and column address commands exist, a separate column in the uncompressed replay buffer may be used to indicate command types.

Figure 2:
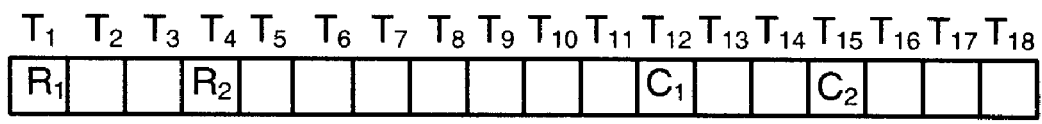
FIG. 2 shows an exemplary timing chart of communication between two electronic units where the first electronic unit is a memory controller and a second electronic unit is a memory, with RAS (Row Address) and CAS (Column Address) shown with exemplary timings.

FIG. 2 shows an exemplary timing of RAS and CAS (where "RAS" and "CAS" include transmission of command and address) where first electronic unit 110 is a memory controller and second electronic unit 120 is a memory. Two cycles are assumed to be required between a first RAS and a second RAS. Ten cycles are assumed to be required between the first RAS and a first CAS, the first CAS being related to the first RAS. A second CAS follows ten cycles after the second RAS, the second CAS must follow the first CAS with two "dead cycles" on the bus. Note that, in FIG. 3, the conventional uncompressed replay buffer is quite sparsely populated. The conventional uncompressed replay buffer replays the commands exactly as originally "played" (transmitted from first electronic unit 110 by simply stepping from row to row in the conventional uncompressed replay buffer.

In many electronic systems, upon detection of an error, a significant number of commands must be replayed, for examples, 512 commands, or 1024 commands. A conventional uncompressed replay buffer in such electronic systems therefore is large, with 512 or 1024 rows for commands, plus many "blank" or "dead cycle" rows between commands, as depicted in FIG. 3.

Figures 4, 5, 6, 7:
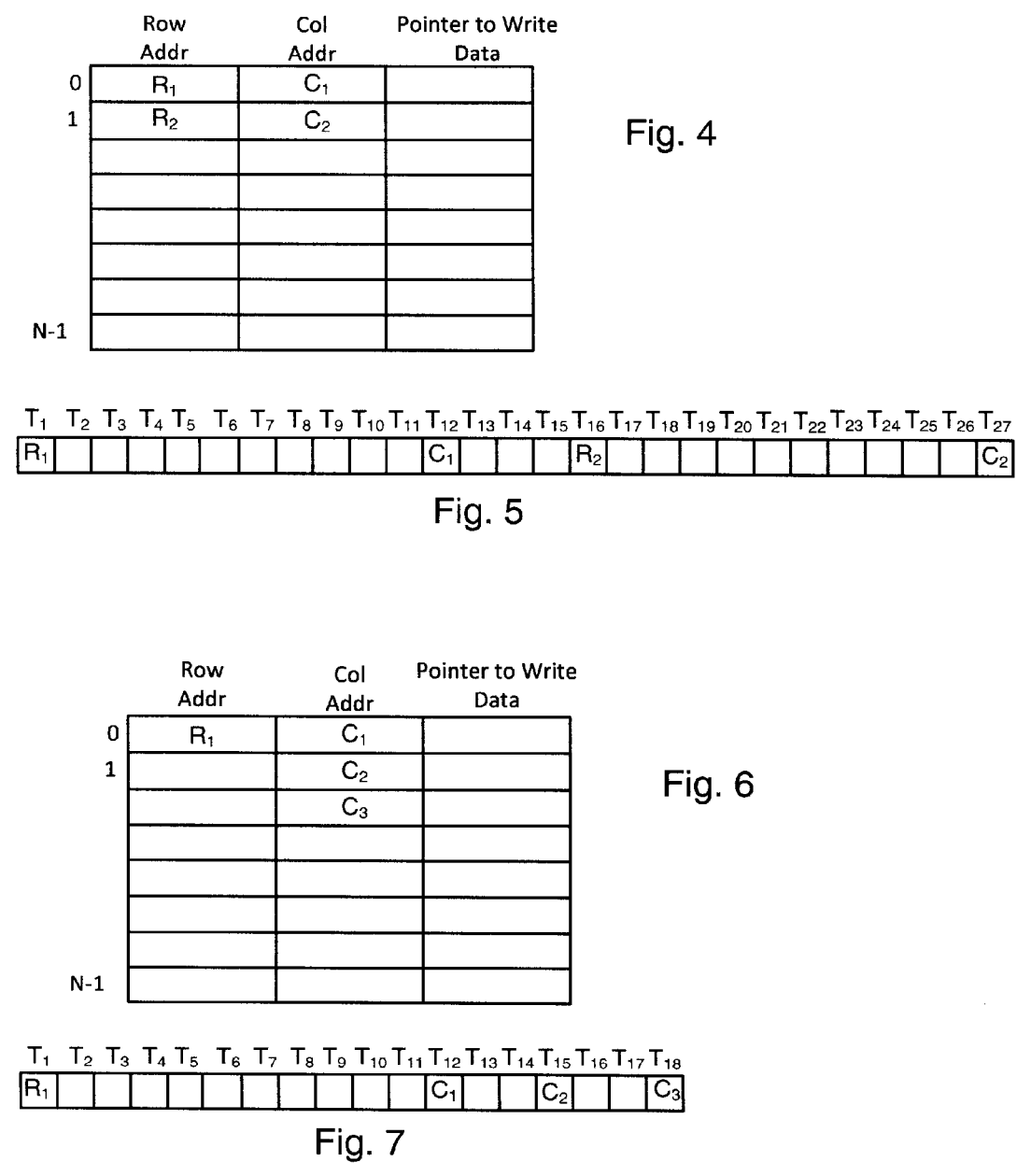

FIG. 4 shows a compressed replay buffer that is specialized for a memory controller that sends RAS/CAS pairs; however, embodiments of the invention may just as easily be made for compressing sequences of other types of commands from a controller. Following a RAS, a CAS is a subsequent, dependent command; that is, the RAS must be transmitted first, followed by the CAS. In a memory access mode known as "open page" mode, a RAS may be followed by more than one CAS. In FIG. 4, with the knowledge that RAS/CAS, during a memory mode known as "closed page", memory accesses are paired, a first RAS and a first CAS are stored in a first ($0^{th}$) row of compressed replay buffer 111. As in the uncompressed replay buffer, a pointer to write data column is included. Compressed replay buffer 111 merely holds commands (and may hold associated data, such pointers to write data), and can not simply be stepped through, one row per bus cycle, as was done with the conventional uncompressed replay buffer, as the compressed replay buffer 111, by itself, lacks timing information, which is supplied by values in required timings 116. In the example with RAS and CAS only, command type is implied by column ("Row Addr" holds row addresses for RAS commands; "Col Addr" holds column addresses for CAS commands. In FIG. 4, R1 and R2 are RAS addresses and C1 and C2 are their respective CAS addresses.

First electronic unit 110, as mentioned, comprises required timings 116, values stored in which, together with the commands stored in compressed replay buffer 111, allows the commands in the compressed replay buffer 111 to be transmitted in compliance with required timings between various command types. Exemplary timing requirements in required timings 116 (FIG. 1) include RTC (RAS to CAS) 112; RTR (RAS to RAS) 113; CTR (CAS to RAS) 114; and CTC (CAS to CAS) 115. It will be appreciated that additional timing requirements may be required to control a memory. It will be further appreciated that other timing requirements may be needed for control of different types of memory (e.g., SRAM (static random access memory), or other first electronic unit 110 and second electronic unit 120 that may not be portions of a memory system at all). RTC 112 stores a value for required number of cycles between a particular RAS and the particular RAS's CAS. RTR stores a value for required number of cycles between a particular first RAS and a subsequent second RAS. CTR 114 holds a value for required number of cycles between a first CAS and a second RAS. CTC 115 holds a value for required number of cycles between a first CAS and a second CAS.

Required timings 116 (RTC 112, RTR 113, CTR 114, CTC 115) may be "hard wired" into first electronic unit 110, or may be loaded into a register or other suitable storage in first electronic unit 110 by another component of electronic system 100, such as a service processor as is well-known in the art. Alternatively, in an embodiment, second electronic unit 120 may transfer timing requirements to first electronic unit 110. For example, second electronic unit 120 may be a DIMM (Dual Inline Memory Module) comprising a buffer chip that knows timing requirements of memory chips thereon where the buffer chip can inform the memory controller of timing requirements of the DIMM (such as values for RTC 112, RTR 113, CTR 114, and CTC 115).

For exemplary purposes, RTC 112 holds a value "10"; RTR 113 holds a value "2"; CTR 114 holds a value "3:; and CTC 115 holds a value "2".

FIG. 5 shows playback using compressed replay buffer 111 and the timing requirements described above. At time $T_1$, $R_1$, a first RAS is transmitted on bus 130. Ten "dead cycles" are transmitted to comply with a value "10" stored in RTC 112. Then $C_1$ is transmitted on bus 130. After $C_1$ has been transmitted, three "dead cycles" (value of "3" stored in CTR 114) are allowed, and then $R_2$, a second RAS is transmitted on bus 130. Ten more "dead cycles" are allowed on bus 130, followed by the $C_2$, a second CAS. The second RAS is not dependent on the first RAS, and therefore is shown as following completion of the first RAS and its subsequent dependent first CAS.

It will be noted that the playback shown in FIG. 5 using compressed replay buffer 111 and the timing requirements is not the original "play sequence" of transmission of commands as depicted in FIG. 2, and in fact, takes "longer". However, in typical systems, BER is on the order of 10E-12, and therefore the need to do a playback is rare, making a longer playback time a good design tradeoff versus use of the larger conventional uncompressed replay buffer. Another advantage in doing the playback in a different order (such as the playback shown in FIG. 5 versus the original transmission—and conventional playback using a conventional uncompressed replay buffer) is that there may be some interaction between commands that, for some combination of commands and data, increase the BER for that combination. Playing the commands back in a different order may avoid such interaction.

Memory, in some electronic systems, may be addressed in "open page" mode; that is, multiple CAS commands may follow a single RAS command. FIG. 6 shows how such commands are stored in compressed replay buffer 111. $R_1$ is a first RAS command that is associated with three CAS commands, $C_1$, $C_2$ and $C_3$. A negative value (or other flag) may be stored in the row address column for C2 and C3 to indicate that the $C_2$ and $C_3$ commands are additional CAS commands during an "open page" access. FIG. 7 shows timing of the "open page" accessing of the memory (second electronic unit 120)

by first electronic unit 110. A first RAS, $R_1$ is transmitted on bus 130. After ten cycles (per value stored in RTC 112), a first CAS, $C_1$, is transmitted, followed by $C_2$ and $C_3$ at 2 cycle intervals according to the value "2" in CTC 115.

The exemplary compressed replay buffers of FIG. 4 and FIG. 6 are configured specifically for a memory controller or similar application. That is, a first column is dedicated to a first command type (RAS) and a second column is dedicated to a second command type (CAS) that is paired with an item in the first column, that is, a RAS is followed by one or more CAS (depending on "open page" or "closed page" mode).

In an alternative embodiment, shown in FIG. 9, a compressed replay buffer 111 embodiment that is more generalized is shown. A first column contains a code for a command type, which was implied by column in the previous embodiments of compressed replay buffer 111. For example (and still using RAS and CAS as commands), a RAS command is command type 000, and a CAS command is command type 001. The command types are placed in the "Cmd Type" column of FIG. 9. The RAS Address, which was simply in the "Row Addr" column in FIG. 4 and FIG. 6, is placed under the "Cmd Data" column (as "000"), indicating a row address the command is to access. Similarly, a CAS command (as "001") under "Cmd Type" is accompanied by a column address in the second column, "Cmd Data". As before, "Associated Data" in the compressed replay buffer 111 may contain pointers to data to be written, or, in other applications the "Associated data" column may be absent, or, if more data is needed in a particular application, additional "Associated Data" columns may be implemented.

In the embodiment of compressed replay buffer 111 of FIG. 9, electronic unit 111 uses a first command type from the "Cmd Type" column from a first command and a second command type from the "Cmd Type" column from a second command following the first command to choose, from required timings 116 (FIG. 1), what required timing must be used to determine how long to wait before transmitting the second command after transmitting the first command. For example, the first command type in the example of FIG. 9 is "000" (a RAS command), and the next command type is "001" (a CAS command). First electronic unit 110 would use this information to access and use the value in RTC 112 (FIG. 1), and, per the example timings used before, wait ten cycles before transmitting the second command. A second RAS ("000") follows the first CAS. CTR 114 is used by electronic unit 110 to correctly space the second RAS after the first CAS.

Compressed replay buffers as depicted in FIGS. 4, 6, and 9 are shown in simplistic form for ease of understanding. It will be understood that various implementations of compressed replay buffers are contemplated. For example, a compressed replay buffer may use a counter in first electronic unit 110 to keep track of how many rows of the compressed replay buffer contain valid commands that may be replayed. That is, if a particular compressed replay buffer has 1000 rows, but only 100 commands have been transmitted (in the embodiment of FIG. 9), the counter would have a value of 100. Alternatively, compressed replay buffer 110 may be implemented as an array, with electronic unit 110 storing a pointer to a "most recently transmitted command" and a pointer to a "least recently transmitted command", in which case, during replay, electronic unit would transmit, during replay, the least recently transmitted command, and then address upwards (or downwards) in the array to the "most recently transmitted command".

The second electronic unit 120, in an embodiment, may request a number of commands to be replayed. For example, if compressed replay buffer 111 (FIG. 1) contains 1024 commands that have been transmitted, second electronic unit 120 may request, over status 140 (FIG. 1) that any number of commands from one to 1024 be replayed. In response, using compressed replay buffer 111 and required timings 116 (e.g., RTC 112, RTR 113, CTR 114 and CTC 115), will replay that number of commands (i.e., the last "M" commands, where "M" is the number of commands requested by electronic unit 120 to be replayed).

Figure 8:
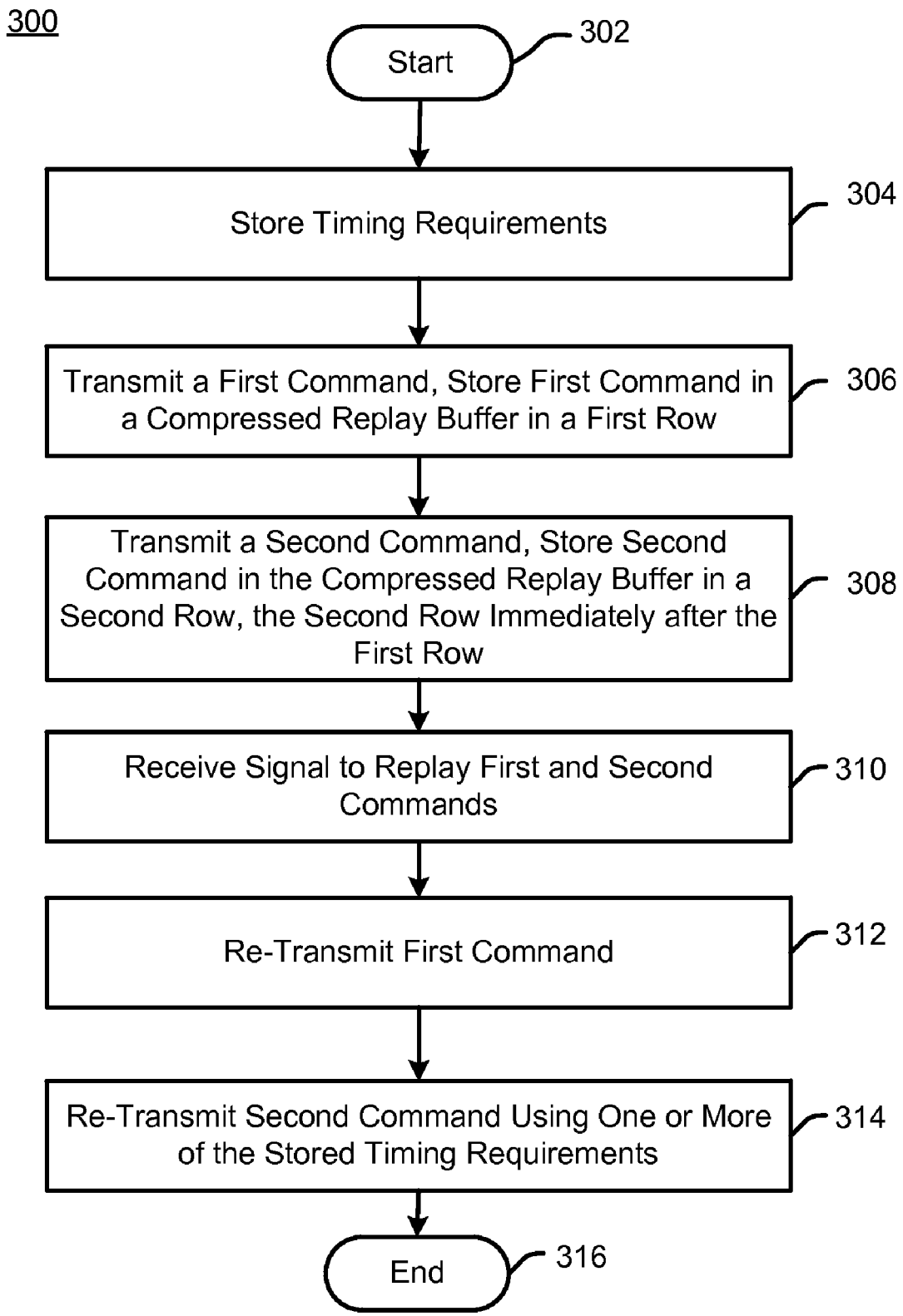
FIG. 8 shows a flowchart of a method embodiment of the invention.

FIG. 8 is a flowchart of a method 300 embodiment of the invention. Method 300 starts at block 302. In block 304, timing requirements are stored in a required timings on a first electronic unit (electronic unit 110 of FIG. 1) that is configured to replay a series of commands at the request of a second electronic unit (second electronic unit 120, FIG. 1). Required timings are values that specify how long an interval must be waited after transmitting a first command of a first command type until transmitting a second command of a second command type can be transmitted. The second command type may be the same command type as the first command type, or may be different. Required timings may be stored in registers, static random access memory, an electronic fuse array, "hard wired" in logic, or other suitable means of holding values. In FIG. 1, exemplary timing requirements are shown to include memory timings RAS to CAS, RAS to RAS, CAS to RAS and CAS to CAS. Other required timings are contemplated, with the example required timings simply shown for explanatory purposes.

In block 306 of FIG. 8, a first command is transmitted by the first electronic unit. A command type and associated information (e.g., RAS address or CAS address) are stored in a compressed replay buffer in a first row of the compressed replay buffer. In a first embodiment of the compressed replay buffer, shown in FIG. 4, a RAS/CAS pair is considered to be a command (RAS) and a subsequent dependent command (CAS) and are stored on a single row of the compressed replay buffer. FIG. 9 shows an alternative embodiment wherein every command, even "paired commands, such as RAS/CAS" is stored in a separate row of the compressed replay buffer. However, in either embodiment of the compressed replay buffer, every row in that replay buffer contains at least one command that may be replayed upon request. A counter in the first electronic unit keeps track of how many rows in the compressed replay buffer have "replayable" commands. That is, if only ten commands have been transmitted and the second electronic unit requests a replay, the counter will be used to replay the ten commands. Alternatively, a column in the compressed replay buffer may contain a "1" if that column contains a valid command for replay.

In block 308, a second command is transmitted by the first electronic unit, and the command and associated information are stored in a second row of the compressed replay buffer. In embodiments such as compressed replay buffer shown in FIG. 4, a subsequent dependent command may be stored on the same row as a command from which it depends.

In block 310, the first electronic unit receives a signal to replay the first and second commands. In practice, many commands, such as hundreds, or thousands, may be replayed, depending on size of the compressed replay buffer and design of the first and second electronic units. In an embodiment, the second electronic unit may request that a specific number of commands be replayed. For example, if a particular compressed replay buffer contains 1024 previously transmitted commands, the second electronic unit may request from one to 1024 commands be replayed.

In block 312, the first electronic unit replays the first command.

In block 314, the first electronic unit replays the second command, using one or more of the values in the required timings. In the example of FIGS. 4 and 5, the first command is a RAS command. The second command is a CAS command. RTC 112 holds a value "10", meaning that there must be ten "dead cycles" between transmission of the first command (RAS) and the second command (CAS). The first electronic unit uses the command type and the stored required timing to determine wait times during transmission of commands to the second electronic unit during replay.

Block 316 ends method 300.

What is claimed is:

1. An electronic system comprising:
a first electronic unit further comprising:
a compressed replay buffer; and
a storage for required timings;
a second electronic unit coupled to the first electronic unit by a bus;
the first electronic unit configured to transmit commands to the second electronic unit using the bus and store the commands in the compressed replay buffer; and
wherein the first electronic unit uses a first command type in the compressed replay buffer, a subsequent second command type in the compressed replay buffer, and a value in the storage for required timings to determine an interval between transmitting a first command and a second command during replay to the second electronic unit.

2. The electronic system of claim 1, the first electronic unit leaving no "dead cycle" rows in the compressed replay buffer, where a "dead cycle" row is a row only used to indicate a timing gap required between command transmissions.

3. The electronic system of claim 1 wherein the first electronic unit is a memory controller and the second electronic unit is a memory.

4. The electronic system of claim 3, wherein the first command type is a row address command and the second command type is a column address command.

5. The electronic system of claim 1, wherein the compressed replay buffer has "N" rows, where "N" is a maximum number of commands that the first electronic unit is required to replay if the second electronic unit reports an error in transmission of commands.

6. The electronic system of claim 5, wherein the second electronic unit may request replay of "M" commands, where "M" is an integer from 1 to "N".

7. The electronic system of claim 1, wherein the compressed replay buffer has "N" rows, where "N" is a number of independent commands.

8. The electronic system of claim 7, wherein a row in the compressed replay buffer comprises the first command and one or more subsequent dependent commands.

9. The electronic system of claim 8, wherein, during replay, the first electronic unit transmits the first command and the one or more subsequent dependent commands before transmitting a non-dependent command.

10. A method of replaying a sequence of commands transmitted from a first electronic unit to a second electronic unit comprising:
storing, in the first electronic unit, required timings between commands that may be transmitted by the first electronic unit;
transmitting, by the first electronic unit to the second electronic unit, a first command and a second command;
storing, by the first electronic unit, the first and second commands in a compressed replay buffer;
receiving, by the first electronic unit from the second electronic unit, a request to replay the first and second commands; and
using the required timings, a command type of the first command, and a command type of the second command, to re-transmit, by the first electronic unit, the first command and the second command from the compressed replay buffer.

11. The method of claim 10, the storing further comprising receiving at least one of the required timings from the second electronic unit.

12. The method of claim 10, further comprising transmitting a third command; and during re-transmission, re-transmitting the first, second, and third commands in an order different from an original transmission order.

* * * * *